Feb. 15, 1966  C. D. SMITH  3,235,003
SPIRAL FLOW BAFFLE SYSTEM
Filed June 4, 1963  2 Sheets-Sheet 1
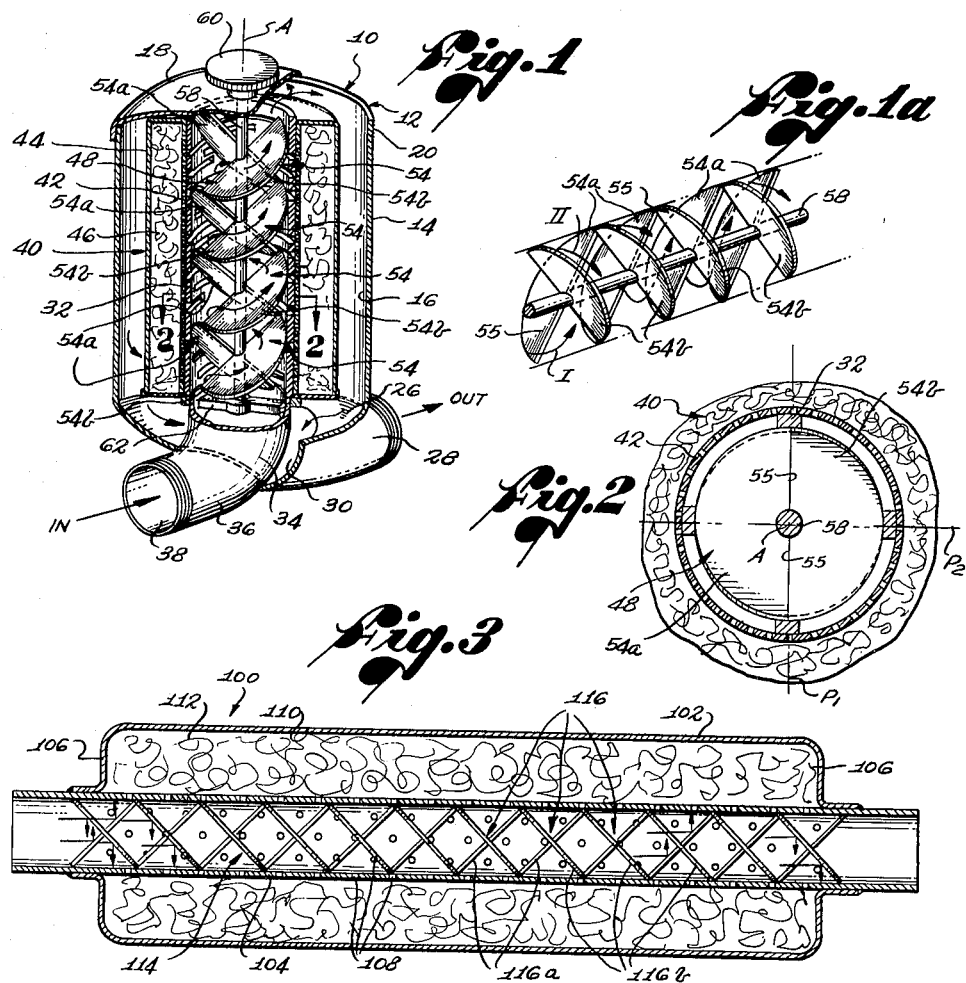
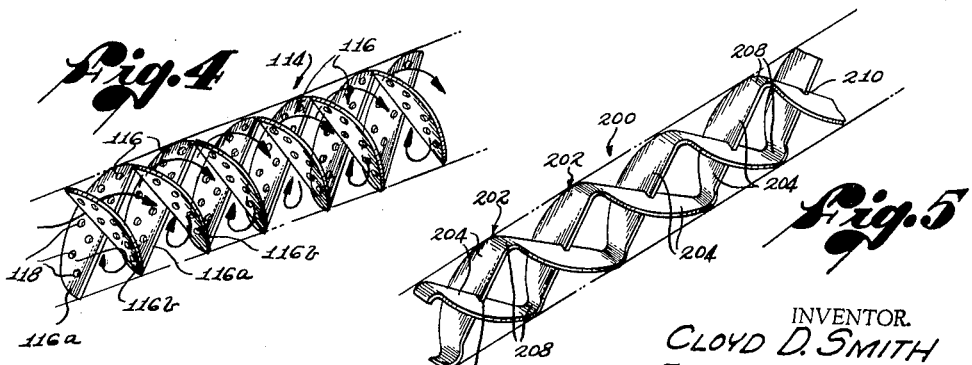
INVENTOR.
CLOYD D. SMITH
BY Forrest J. Lilly
ATTORNEY

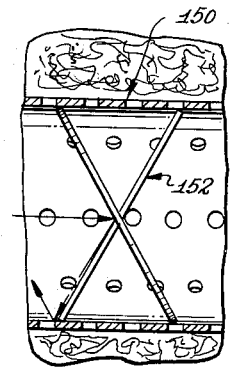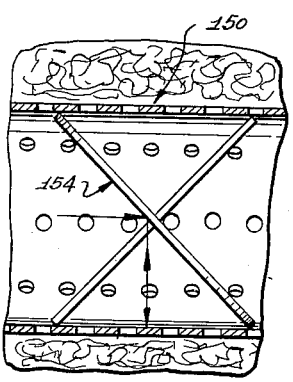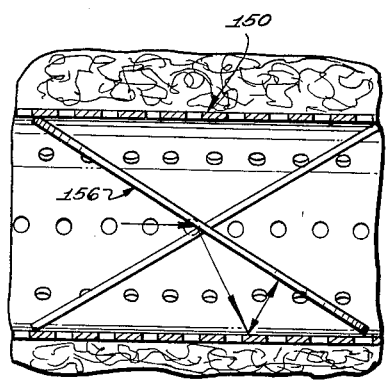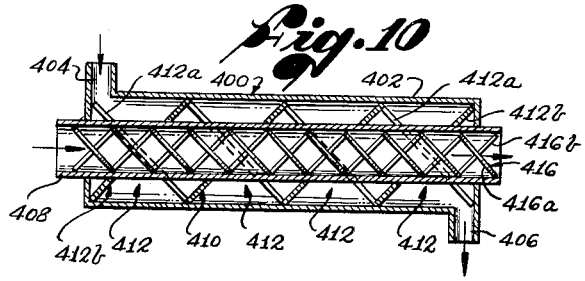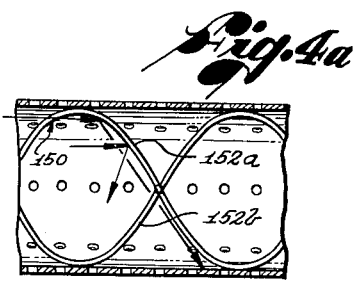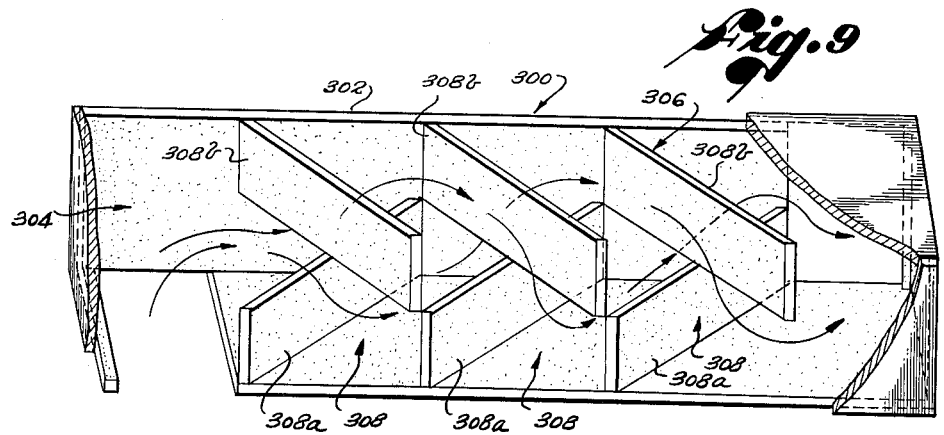

United States Patent Office 3,235,003
Patented Feb. 15, 1966

3,235,003
SPIRAL FLOW BAFFLE SYSTEM
Cloyd D. Smith, 14928 La Cumbre Drive,
Pacific Palisades, Calif.
Filed June 4, 1963, Ser. No. 285,367
5 Claims. (Cl. 165—135)

This invention relates generally to flow-direction-controlling devices for fluids and particularly to unique spiral-flow-inducing baffle structures for fluid conduits, and the like, and to fluid flow devices embodying such baffle structures. A number of typical applications of spiral-flow-inducing baffle structures in accordance with the invention will be disclosed.

In many fluid systems, it is desirable or essential that a fluid flowing through a conduit traverse a spiral or helical flow path. For example, so-called static centrifugal separators are known in the art wherein a fluid, which may be a liquid, a vapor, or a gas, is directed through a conduit containing baffles that are arranged to cause the fluid to follow such a spiral flow path. As a consequence of the rotational component of motion, or swirling motion, of the fluid, the latter is subjected to a centrifugal force which drives relatively dense substances entrained in the fluid toward the conduit wall, where such substances are collected or withdrawn. Fluid emerging from the separator is thereby relatively free of such substances. A separator of this kind may be used, for example, to separate liquid from a gas or vapor, solid matter from either a liquid or a gas, a relatively dense fluid from a fluid of less density, and so on.

Another kind of fluid flow device in which spiral fluid flow is desirable is a so-called "straight-through" muffler for an internal combustion engine. Mufflers of this kind are known in the art, for example, wherein spiral flow of exhaust gas traveling through the mufflers is induced by baffles in the muffler exhaust passage. In these mufflers, the baffles serve a dual function. First, they induce spiral exhaust gas flow through the mufflers. This spiral flow is desirable since it increases the effective length of the exhaust gas flow path through the muffler and, thereby, the effective residence time of the exhaust gas within the muffler. Improved attenuation of objectionable acoustic energy present in the exhaust gas is thus attained. The second function of the baffles is to break up the acoustic wave pattern in the exhaust gas stream and to reflect the acoustic energy waves in the exhaust stream into the surrounding acoustic attenuation means or "treatment" of the muffler, to wit, acoustically absorbent material and/or acoustic attenuating chambers surrounding the exhaust gas passage.

The present invention also has application in the field of heat exchange, such as to water heaters. In the conventional case of a straight hot air tube running through a water tank, for example, a heat insulating boundary layer of stagnant air is formed on and clings to the inside surfaces of the hot air tube. Not only does this boundary layer serve as a heat insulating film, reducing the rate of heat transfer from the hot air in the tube to and through the wall of the tube to the water on the outside, but it reduces the velocity of hot air flow adjacent the tube wall, so there is a velocity gradient from the wall of the tube to the center or core region of the tube where the hot air flow attains its maximum flow velocity. The relatively low velocity of the air stream adjacent to the boundary layer means failure to achieve optimum scrubbing against the boundary layer, and thus removal thereof, and the resulting retention of the boundary layer means, in turn, that the heat transfer rate otherwise attainable is not realized. Also, as mentioned, the heated central core region of the air flow through the tube is at maximum velocity, while outside this central core region, the flow velocity is reduced, and flow velocity at the tube walls is minimized. The air in the outer regions of the tube is thus resident in the tube for longer times, less heat flows through thtse regions per given unit of time, and the temperature in these regions is, therefore, reduced. The air flowing through the tube is thus stratified temperature-wise, with the coolest air unfortunately nearest the tube wall. Use of spiral flow baffles in the hot air tube improves the rate of heat transfer very measurably by providing a longer flow path of the hot air over the tube surfaces, and thereby affording added opportunity for the heat exchange process to occur. Moreover, the spirally directed hot air stream is effective to scrub away the heat insulating boundary layer, and thereby improve heat transfer. It will be seen that, in such heat transfer applications, it is desirable to provide a spiral baffle structure which will afford a long flow path, which will mix the air, so as to avoid unfavorable temperature stratification, and which will act to scrub away the stagnant boundary layer on the tube wall.

In the past, baffles for inducing spiral fluid flow in conduits have typically comprised a conventional helix, such as a helically twisted metal strip or vane, or a helical structure which is formed in some other similar way. A helical baffle of this kind, however, is deficient in several respects. For example, such a baffle is difficult to form. Further, the helically twisted baffle is awkward to handle and to insert into a close-fitting fluid passage. Other more serious deficiencies of the existing spiral-flow-inducing helical baffles reside in the fact that only a relatively small portion of the total surface area of these baffles is effective to reflect incident acoustic wave energy and in the fact that the baffles comprise only a single spiral. As a result, only one spiral flow path through the baffle is provided, whereby the baffle may create excessive back pressure in the fluid stream in which it is placed. The existing baffles of this type are also costly to make.

A general object of the present invention is to provide unique spiral-flow-inducing baffle structures for fluid conduits and the like which avoid deficiencies inherent in existing baffle structures for this purpose and which have new and useful properties such as longer flow path, improved mixing, and low back pressure.

Another object of the invention is to provide baffle structures of the character described which are uniquely designed for simplicity and economy of manufacture and efficiency of operation.

A more specific object of the invention is to provide baffle structures of the character described having a unique, open, multi-spiral configuration, whereby a plurality of spiral flow paths are provided through the baffle structures and the latter create minimum back pressure in the fluid stream in which they are placed as well as long flow path.

A further object of the invention is to provide specific fluid flow devices embodying the present improved baffle structures, to wit, but without limitation, a static centrifugal separator, a muffler, an acoustic filter, and a heat exchanger.

Yet a further object of the invention is to provide spiral-flow-inducing baffle structures of the character described which are uniquely designed for fabrication from sheet material, or by molding or casting, or by other conventional manufacturing techniques.

Other objects, advantages, and features of the invention will become readily evident to those skilled in the art as the description proceeds.

Briefly, the objects of the invention are attained by providing baffle structures made up of at least one, and in most cases a multiplicity of, axially spaced baffle plate sets, each including at least a pair of crossed baffle plates. The baffle plates of each plate set are disposed in intersecting planes inclined in opposite directions from a plane containing the axis of the baffle structure. In some cases, the corresponding baffle plates of the several plate sets are disposed in parallel planes. In other cases, the corresponding baffle plates are disposed in planes which are inclined at various angles to one another.

In use, a baffle structure according to the invention is axially inserted into a fluid conduit and attached to or otherwise secured against axial movement therein. As will be seen later, a unique feature of at least one form of the present baffle structure is that fluid pressure acting axially on the baffle tends to lock the latter in fixed position. Fluid flowing through the conduit initially impinges the undersurfaces of the baffle plates of the first or upstream baffle plate set and is diverted by such baffle plates, and the surrounding conduit wall, in a generally spiral flow pattern into the spaces between the baffle plates of the first and second baffle plate sets. The baffle plates of the latter sets then continue to divert the fluid in a spiral flow pattern into the spaces between the baffle plates of the second and third baffle plate sets, such action continuing until the fluid finally emerges from the downstream end of the baffle structure. As a result of the deflection of the fluid stream by the baffle structure, therefore, the fluid is caused to flow along a generally spiral or helical flow path through the conduit. Actually, the baffle structures of the invention define, in effect, multi-spiral configurations which induce flow of the fluid along two or more separate spiral flow paths. As a consequence of this multi-spiral configuration and the wide open construction of the baffle structures and the inclination of the baffle plates, the back pressure produced by the baffle structures is relatively slight.

In practice, the spiral or swirling motion of the fluid which is induced by the baffle structures of the invention may be for the purpose of increasing the effective length of the flow path of the fluid through the fluid conduits in which the structures are located, or to subject the fluid to a centrifugal force, or for a combination of these two purposes. The baffle plates of the present baffle structures are also uniquely designed to effect a scrubbing action on heat insulating boundary layers on baffles or conduit surfaces in some applications and, in other applications, to reflect incident acoustic wave energy contained in the fluid. In some cases, the baffle plates may be perforated to create diffusion of the fluid and/or acoustic energy in the fluid. The baffle plates may also be acoustically treated to absorb incident acoustic wave energy or they may be treated with a mechanical filtering material, constructed of fine wire mesh, and/or be otherwise constructed to effect mechanical filtration of the fluid flowing over the baffles.

The present spiral-flow-inducing baffle structures have general utility and may be used wherever it is desirable or essential to cause a fluid to follow a spiral flow path. In order to facilitate a complete understanding of the invention, however, certain specific applications of the present baffle structures are disclosed herein, to wit, a static centrifugal separator, a muffler, an acoustic attenuator, or filter, and a heat exchanger. Numerous other applications of the baffle stluctures will immediately occur to those skilled in the art. Accordingly, it should be understood, at the outset, that these disclosed applications and embodiments of the invention are intended to be illustrative and not limitative of the invention.

A better understanding of the invention may be had from the following detailed description thereof, taken in connection with the annexed drawings, wherein:

FIG. 1 is a perspective view, partly in section, of a static centrifugal separator embodying a spiral-flow-inducing baffle structure according to this invention;

FIG. 1a is an enlarged perspective view of the spiral-flow-inducing baffle structure embodied in the separator of FIG. 1;

FIG. 2 is an enlarged section taken on line 2—2 in FIG. 1;

FIG. 3 is a longitudinal section through a muffler embodying a spiral-flow-inducing baffle structure according to this invention;

FIG. 4 is an enlarged perspective of a portion of the baffle structure embodied in the muffler of FIG. 3;

FIG. 4a illustrates a baffle structure according to the invention having curved baffle plates;

FIG. 5 illustrates an alternative baffle structure according to the invention;

FIG. 6, 7 and 8 illustrate portions of baffle structures according to the invention in which the baffle plates are disposed at different angles to the axes of the structures;

FIG. 9 illustrates an acoustic filter embodying a modified baffle structure according to the invention; and FIG. 10 is a longitudinal section through a heat exchanger embodying a baffle structure according to the invention.

Referring now to these drawings, and particularly to FIG. 1 thereof, the illustrated centrifugal separator 10 comprises a body 12 including an outer, generally cylindrical housing 14. Within this housing is a chamber 16 which opens through the upper end of the housing, as the latter is viewed in FIG. 1. A removable cap or cover 18, releasably held in position in any convenient way, as by screw threads 20, normally closes this open upper end of the housing. A seal (not shown) may be provided to seal against fluid leakage between the housing and cover.

The lower end of the housing 14 is closed by an end wall 26. Leading from this end wall, in a generally tangential direction of the housing 14, is an outlet 28. The interior passage 30 in this outlet opens generally tangentially to the lower end of the chamber 16 through the end wall 26 thereof. Rising coaxially through the chamber 16, from the lower end wall 26, is a perforate cartridge supporting sleeve 32. The upper end of this sleeve is open and terminates a distance below the cover 18. The lower end of the sleeve 32 continues in a conduit 34 which extends through the bottom wall 26 of the housing and the wall of outlet 28 and terminates in an external inlet 36. Inlet 36 extends generally radially of the housing 14 in a direction opposite to the direction of extension of the outlet 28. The interior passage 38 of the inlet opens to the lower end of the perforate sleeve 32. The inlet and outlet may be terminally threaded, as shown, for connection to fluid lines (not shown).

Slidably fitted on the perforate supporting sleeve 32 is a disposable collector cartridge 40. Cartridge 40 comprises a perforate inner wall 42, an imperforate outer wall 44, and a fibrous filler material 46 between the inner and outer walls 42 and 44. The perforations in the sleeve 32 and the inner wall 42 of cartridge 40 preferably comprise circumferentially extending slits, as shown.

In operation, fluid to be filtered enters the separator 10 through the inlet 36 and flows upwardly through the perforate cartridge supporting sleeve 32. The fluid emerging from the upper end of the sleeve 32 then flows downwardly through the annulus between the wall of the housing 14 and the outer surface of the cartridge 40, finally exhausting from the separator through the outlet 28.

Positioned within the cartridge supporting sleeve 32 is a helical-flow-inducing baffle structure 48 which is uniquely constructed in accordance with this invention to cause the fluid to flow upwardly through the supporting sleeve 32 in a spiral or helical flow pattern. As a consequence of this spiral flow, the fluid is subjected to a centrifugal force which tends to drive the more dense entrained substances in the fluid toward the perforate wall of the supporting sleeve 32. These substances pass through the perforations in the wall of the sleeve and the perforations in the inner wall 42 of the cartridge 40 and collect in the interior of the cartridge. In this way, entrained liquids or liquid particles can be separated from gases or vapors, entrained finely divided solid matter or particles can be separated from either liquids or gases, fluids of different densities may be separated, and so on. It is also thus possible to separate particles of solid matter of different densities which are blown through the separator.

The spiral-flow-inducing baffle structure 48 will be seen to comprise a multiplicity of baffle plate sets or pairs 54 disposed in spaced relation along the axis of the cartridge supporting sleeve 32. Each plate pair includes two opposing baffle plates 54a and 54b located at opposite sides of a first plane $P_1$ containing the central axis A of the baffle structure 48. The plates of each such pair have opposing edges 55 located approximately in the latter plane.

The baffle plates of each baffle pair are located in planes which intersect one another, as shown. According to the preferred practice of the invention, these planes of the baffle plates are normal to the axial plane $P_1$ and are equally inclined to opposite sides of a second plane $P_2$ normal to the plane $P_1$ and containing the baffle axis A. The opposing edges 55 of each pair of baffle plates 54a, 54b intersect approximately on the sleeve axis, as shown in the drawings.

In the baffle structure 48 under consideration, the several baffle plates 54a are located in spaced parallel planes, as are the several baffle plates 54b, as clearly shown in FIGS. 1 and 1a. Also, the lower tips of the baffle plates of each plate pair 54 abut and are suitably joined, as by integral molding or casting, or by soldering, welding, cementing, or the like (depending upon the composition of the baffles), to the upper tips of the plates of the adjacent lower plate pair. Similarly, the upper tips of the baffle plates of each baffle plate pair correspondingly abut and are joined to the lower tips of the plates of the adjacent upper plate pair. As will be seen later, however, in some applications of the invention, only one plate pair may be used or, where several plate pairs are employed, adjacent pairs may be axially spaced and the plates of one pair may not parallel the respective plates of the other plate pairs.

The baffle plates 54a and 54b, when viewed in the axial direction of the cartridge supporting sleeve 32, as in FIG. 2, are seen to occupy the entire cross-sectional area of the passage through the sleeve. Since this passage is circular, it is evident that each baffle plate 54a and 54b is one-half of an ellipse, the major axis of which lies in the common plane of the opposing edges of the baffle plates.

For reasons which will appear shortly, it is desirable to have the entire baffle structure 48 rotatably mounted in the cartridge supporting sleeve 32. To this end, the baffle structure is fixed to a central supporting shaft 58 which projects through the housing cover 18 and mounts a knurled grip 60 by which the shaft may be turned to rotate the baffle structure in the supporting sleeve 32. The shaft is sealed to the cover to prevent fluid leakage therebetween. The lower end of the shaft 58 is journaled in a cross member 62 extending across and joined to the lower end of the sleeve 32. A thrust shoulder (not shown) may be provided on the shaft 58 below the cover 18 to restrain the baffle structure against upward axial movement. The baffle structure preferably has a light friction fit in the sleeve 32 for restraining the structure against rotation under the action of fluid flowing through the sleeve, and for other reasons to be seen shortly.

In operation, fluid flowing through the seperator 10, in the direction described earlier, passes upwardly through the cartridge supporting sleeve 32 and over the baffle structure 48 therein. Upon encountering the first, or lowermost, baffle plate pair 54, one-half of the fluid stream impinges the undersurface of the baffle plate 54a of the first plate pair and the other half of the fluid stream impinges the undersurface of the other plate 54b of the first plate pair. It is evident that these first baffle plates, and the surrounding wall of sleeve 32, in effect, divert the respective portions of the fluid stream in an upward and circumferential direction of the sleeve 32, thereby imparting to the fluid an initial upwardly spiraling flow direction. One-half of the fluid stream flows from the underside of the first baffle plate 54a around and upwardly in the sleeve 32 into the space between the first and second baffle plates 54b, and the other half of the fluid stream flows from the underside of the first baffle plate 54b around and upwardly into the space between the first and second baffle plates 54a. The first and second baffle plates 54a and the first and second baffle plates 54b, and the surrounding wall of sleeve 32, then continue to direct the respective portions of the fluid stream in upwardly spiraling paths into the spaces between the second and third baffle plates 54a and the second and third baffle plates 54b, respectively. Similarly, the latter baffle plates continue to direct the fluid in upwardly spiraling paths into the spaces between the third and fourth baffle plates 54a and the third and fourth baffle plates 54b, and so on, until the fluid finally emerges from the upper end of the baffle structure.

It is evident, therefore, that the baffle structure 48 acts to direct the fluid flowing upwardly through the cartridge supporting sleeve 32 in an upwardly spiraling flow pattern, whereby the fluid is subjected to a centrifugal force which is effective to drive the more dense substances, such as foreign matter, entrained in the fluid radially outward toward the wall of the cartridge supporting sleeve 32 and finally through the perforations in the latter sleeve into the collector cartridge 40, all in the manner discussed earlier. It is to be noted that the baffle structure 48 defines, in effect, a double-spiral or double-helix structure, whereby fluid flowing through the cartridge supporting sleeve 32 is directed upwardly along two spiraling flow paths I and II. Because of this double spiral configuration and the wide open construction of the baffle structure, the total effective flow path area through the baffle structure is substantially increased with respect to a typical conventional single spiral structure for inducing spiral fluid flow, and the pressure drop along the present baffle structure is substantially reduced with respect to the pressure drop which occurs along such a conventional helix structure. The present baffle structure, therefore, creates substantially less back pressure in the fluid than a conventional helical baffle structure.

When it becomes necessary to replace or clean the cartridge 40, the latter can be simply removed from the housing 14 by removing the cover 18 and baffle structure 48 and then sliding the cartridge upwardly from its supporting sleeve 32. It is also desirable to periodically scrape any accumulations of matter from the inner surface of the cartridge supporting sleeve 32. This is accomplished by turning the grip 60 to rotate the baffle structure 48 in the sleeve, thereby to cause the baffle plates 54a and 54b to scrape the inner surface of the sleeve.

It is obvious that the present baffle structure 48 appreciably increases the overall length of the effective flow path of the fluid through the cartridge supporting sleeve 32, as compared to the axial length of the sleeve, for example. In this way, the effective residence time of the fluid in the separator is substantially increased, whereby the efficiency of the separator 10 is appreciably improved. While the baffle structure has been illustrated as having flat baffle plates 54a, 54b, curved baffle plates may be used in some cases, as suggested in FIG. 4a, for example.

The muffler 100 illustrated in FIG. 3 is of the so-called "straight-through" type and comprises an outer muffler housing 102 which may be cylindrical, elliptical, or any other shape in cross section, in accordance with conventional muffler practice. Extending through the muffler housing is an exhaust conduit or pipe 104, the ends of which project a distance beyond the ends of the housing for connection in the exhaust line from an internal combustion engine, or other device requiring a muffler. The muffler shown in FIG. 3, for example, is particularly designed for use on an automotive vehicle. The ends of the muffler housing 102 are closed by end walls 106 which are welded or otherwise joined to the exhaust pipe 104 in the usual way.

The portion of the exhaust pipe 104 contained within the muffler housing 102 is perforated. The perforations 108 in the pipe may be of any suitable shape and arrangement. The annular space 110 between the muffler housing 102 and the exhaust pipe 104 defines an acoustic attenuation chamber which is acoustically treated or constructed in any of the well-known ways to effect acoustic attenuation of the acoustic energy waves which are reflected into the chamber in the manner discussed below. For simplicity, the acoustical treatment of the chamber 110 in the illustrated muffler comprises, simply, an acoustically absorbent material 112. Such an acoustical treatment is most effective for high frequency attenuation. Alternatively, the acoustic chamber 110 of the muffler may be axially divided into separate chambers by partitions of different axial spacing for attenuating specific acoustic frequencies. Such an acoustical treatment is most efficient for low frequency attenuation. A combination of these two common types of acoustical treatments may be used in the muffler to effect broad band attenuation.

The acoustic energy waves present in the exhaust gas flowing through the muffler are reflected into the acoustic attenuation chamber 110 by a baffle structure 114 constructed in accordance with this invention and positioned in the exhaust pipe 104. This baffle structure is essentially identical to the baffle structure in the separator of FIGS. 1 and 2 and comprises axially spaced baffle plate pairs 116, each including a pair of angularly disposed baffle plates 116a and 116b.

The baffle structure 114, like the baffle structure 48 in FIGS. 1 and 2, defines, in effect, a double-spiral structure, which, in the muffler of FIG. 3, induces spiral or helical flow of the exhaust gas passing through the exhaust pipe 104. As a result, the effective length of the flow path of exhaust gas through the muffler 100 is substantially greater than the length of the exhaust gas flow path through a conventional straight-through muffler. In this way, the effective residence time of the exhaust gas within the muffler is increased with respect to the residence time of the exhaust gas in the conventional straight-through muffler, whereby superior acoustic attenuation is attained in the present muffler without substantially increasing the back pressure.

It is also evident, of course, that the swirling motion of the gas within the exhaust conduit 104 creates a centrifugal force on the gas which drives the more dense substances in the gas, such as carbon particles, radially outward through the perforations 108 in the exhaust pipe 104 into the acoustic attenuation chamber 110. Thus, the exhaust gas emerging from the present muffler is appreciably cleaner than the exhaust gas emerging from a conventional muffler. Moreover, sparks entrained in the exhaust gas are thus trapped and quenched in the muffler, therby avoiding the possibility of such sparks creating fires, as has been known to ocur. Moisture entrained in the exhaust gas is also driven, by centrifugal force, into the acoustic chamber 110. If desired, the muffler housing 102 may be provided with an opening (not shown) to permit such moisture to drain from the chamber.

In the case of the illustrated muffler, the baffle structure 114 serves the additional function of reflecting acoustic enregy waves present in the exhaust gas into the acoustic chamber 110, wherein such waves are absorbed or otherwise attenuated. Thus, the acoustic energy or pressure waves contained in the exhaust gas flowing through the muffler expand or travel both radially outward toward the perforated wall of the exhaust pipe 104 and axially through the pipe in the direction of exhaust gas flow therethrough. A portion of the radial wave components, of course, passes through the pipe perforations 108 into the acoustic chamber 110, wherein the waves are absorbed or otherwise attenuated. The axial components of the acoustic waves, on the other hand, impinge the inclined baffle plates 116a and 116b of the baffle structure 114 and are reflected therefrom toward the perforated wall of the exhaust pipe, as indicated by the arrows in FIG. 3. A portion of this reflected wave energy travels through the pipe perforations 108 into the acoustic chamber 110 and is therein absorbed or attenuated like the radial wave components. It is to be noted that the reflection of acoustic wave energy occurs in two opposing directions from the baffle structure 114. Thus, the baffle plates 116a reflect the incident acoustic wave energy upwardly in FIG. 3, while the baffle plates 116b reflect the incident acoustic wave energy downwardly.

The illustrated muffler is, therefore, uniquely arranged to effect superior attenuation of the acoustic wave energy present in the exhaust gas as compared to the acoustic attenuation which occurs in the conventional "straight-through" mufflers. One well-known advantage of such a muffler, of course, is that it creates less back pressure than the labyrinth-type muffler, wherein exhaust gas is forced to traverse a zigzag or other circuitous path. As discussed earlier in connection with the centrifugal separator of FIGS. 1 and 2, the present baffle structure, defining a double spiral, as it does, effects gas flow along two spiral paths with the result that the back pressure of the gas is increased only slightly by the present baffle structure, as compared to the conventional straight-through muffler and is substantially less than the back pressure created by a conventional labyrinth-type muffler. The baffle structure 114, when viewed in the axial direction of the muffler, completely blocks the line of sight through the muffler, in the same way as does the baffle structure 48 in FIG. 2. As a result, there is no possibility of acoustic pressure waves traveling axially through the exhaust pipe without encountering a reflection toward the surrounding acoustic attenuation chamber 110. In the existing "straight-through" muffler, of course, acoustic pressure waves can travel axially through the exhaust pipe of the muffler.

The baffle plates 116 and 116b of the baffle structure 114, while shown as flat, may, in some cases, be curved. FIG. 4a illustrates a baffle structure 150 having such curved baffle plates 152a and 152b. Curved baffle plates may be useful, for example, to effect reflection of acoustic wave energy at different angles from different parts of the plates, as indicated by the arrows in FIG. 4a, thereby to break up the acoustic wave pattern in the exhaust gas. Also, acoustic waves which arrive at each such curved plate at various angles of incidence are reflected into the acoustic attenuation chamber 110 of the muffler. The curvature of the baffles may also serve, in some cases, to reduce the air flow resistance through the baffle structure. The baffle plates may, in some cases, also be perforated, as shown at 118 in FIG. 4, to effect diffusion of the exhaust gas and/or the acoustic wave pattern in the exhaust gas. Such perforations, for example, diffuse the low frequencies, and tend to shift the frequencies present to a higher frequency range wherein attenuation is more easily accomplished. The acoustic attenuation efficiency of the muffler can be further improved by coating the baffle structure with a suitable acoustically absorbent material or providing the baffle structure with other acoustic treatment.

In the muffler illustrated in FIG. 3, the baffle structure 114 comprises a single integral unit in which all of the baffle plates 16a are parallel to each other and inclined at the same angle to the longitudinal axis of the exhaust pipe 104, as are the baffle plates 116b. FIGS. 6–8 illustrate baffle structures with baffle plates set at different angles. In these figures, acoustic energy waves present in the fluid flowing over the baffle structure have been depicted by arrows to illustrate how changing the angles of the baffle plates of a present baffle structure changes the angle of reflection of acoustic waves from the plates, thereby to vary the acoustic attenuation efficiency of the muffler at different acoustic frequencies. It is to be noted here that baffle plates which are set at a large angle with respect to a plane normal to the axis of the baffle structure, as are the baffle plates in FIG. 8, offer less resistance to fluid flow, and, therefore, create less back pressure, than baffle plates set at smaller angles, that is, more nearly normal to the baffle axis, as are the baffle plates in FIGS. 6 and 7. On the other hand, baffle plates set at larger angles, as in FIG. 8, increase the length of the flow path. This design factor may be advantageously employed in all applications of the invention.

In some cases, several individual baffle plate pairs, disposed in spaced relation along the muffler exhaust pipe and having baffle plates arranged at different angles to the exhaust stream, may be used. In this regard, FIGS. 6, 7 and 8 can be taken as illustrating successive sections of a unitary exhaust pipe 150 containing such individual baffle plate pairs 152, 154 and 156 whose baffle plates 158, 160 and 162 are disposed at different angles to the direction of exhaust gas flow.

The baffle structure 48 in the centrifugal separator of FIGS. 1 and 2 and the baffle structure 114 in the muffler of FIG. 3 can be made in various ways. For example, these baffle structures may be molded or die cast. Alternatively, the baffle plates of these structures may be stamped out of sheet material or may be otherwise separately formed and then joined tip-to-tip and edge-to-edge to form a baffle structure. Where the baffle structure surrounds a separate shaft or tube, or the like, as in the case of the baffle structure 48 of FIGS. 1 and 2, the baffle plates may be individually attached to the shaft or tube rather than to one another.

FIG. 5 illustrates a further alternative method of forming a baffle structure according to the invention. In this case, the baffle structure 200 is composed of identical blanks 202 which may be stamped from sheet material, for example. Each blank 202 comprises lobes or baffle plate sections 204 which are located alternately on opposite sides of the longitudinal centerline of the respective blank. The tips of adjacent baffle plate sections or lobes 204 are joined by narrow connecting portions 208.

Blanks 202 are fashioned into a baffle structure by bending the blanks at the connecting portions 208 thereof into the sawtooth, zigzag, or sinusoidal configuration illustrated and then intertwining the blanks, as shown, so that the opposing edges of opposing baffle plate sections 204 abut and intersect one another. These edges of the baffle plate sections may be notched, as shown at 210, to effect interlocking of the blanks during assembly. After assembly, the opposing edges of the baffle plate sections may be joined where they cross, as by welding, to form a completed structure. When this baffle structure is placed in a fluid conduit, pressure of fluid against the structure tends to expand the latter against the conduit wall to effect self-locking of the baffle structure in the conduit. The same applies to the baffle structure 114 of FIGS. 3 and 4.

In each of the baffle structures discussed thus far and hereinafter described, the particular shape of the individual baffle plates, that is, whether these plates are semi-elliptical, as shown in FIGS. 1–5, or some other shape, depends upon the cross-sectional configuration of the conduit or pipe in which the baffle structures are to be used. For example, in a square conduit, the baffle plates may be rectangular in shape.

The baffle structures of the invention may be made of various materials, such as metal, plastic, wood, fiber glass, wire mesh, etc., depending upon the characteristics of the fluid with which the baffle structures are to be used and the particular functions to be performed by the baffle structures in addition to inducing spiral fluid flow, i.e., acoustic energy reflection, mechanical filtration, acoustic energy absorption, and so on. It will be further immediately evident to those skilled in the art that while the baffle structures described thus far define, in effect, double-spiral or double-helix structures, it is quite possible to provide additional baffle plates and arrange the several baffle plates in such a way as to form a triple-spiral, for example. In this case, of course, the edges of the several baffle plates would be located in three angularly disposed planes rather than in a common plane, as in the case of the illustrated baffle structures.

FIG. 9 illustrates an acoustic attenuator, or sound filter, 300 according to the invention. This filter comprises a rectangular box-like housing 302 having a rectangular passage 304 therethrough. Within this passage is a baffle structure 306 comprising baffle plate pairs 308, each including crossed, flat, rectangular baffle plates 308a and 308b. This modified baffle structure obviously defines, in effect, a double-spiral structure, similar to the baffle structures described earlier. Baffle structure 306 induces helical flow of the fluid passing through the filter and reflects acoustic wave energy present in the fluid toward opposing walls of the filter housing 302. These housing walls are lined with or composed of an acoustically absorbent material which absorbs the incident wave energy. The baffle structure may also comprise or be coated with an acoustically absorbent material.

This type of acoustic filter, or attenuator, is useful, for example, in an air duct of an air conditioning system to deaden noise. The primary purpose of inducing spiral fluid flow in the illustrated filter is to increase the effective length of the flow path of fluid through the filter and, thereby, the effective residence time of the fluid in the filter without appreciably increasing back pressure. In this way, maximum acoustic attenuation is attained. It is possible, however, that such a filter could have perforated acoustically absorbent walls surrounded by a collection chamber for collecting dust and other foreign matter entrained in the fluid and which is driven through the perforations of the walls by centrifugal force, as in the earlier described devices according to the invention.

The heat exchanger 400 shown in FIG. 10 comprises an outer casing 402 having a fluid inlet 404 at one end and a fluid outlet 406 at the other end. Extending axially through the casing is a fluid conduit 408, having a fluid inlet and outlet at opposite ends. Mounted within the casing 402, about conduit 408, is a baffle structure 410. Baffle structure 410 comprises, in a manner similar to the earlier baffle structures, a succession of baffle plate pairs 412, each including a pair of crossed baffle plates 412a and 412b. These baffle plates may be flat, as in FIG. 10, or curved, for example, as suggested in FIG. 4a. Within the conduit 408 is a second baffle structure 414 having a succession of baffle plate pairs 416 including crossed baffle plates 416a, 416b.

In this case, the baffle structures 410 and 414 induce spiral flow of fluid about the outside of and within the central fluid conduit 408, thereby to increase the effective lengths of the fluid flow paths through and about the exterior of the fluid conduit 408. The resultant swirling of the fluid within and about the conduit also effects scrubbing away of the stagnant, thermally insulating boundary layers of fluid existing at the inner and outer surfaces of the conduit 408, thereby substantially improving the coefficient of heat transfer between a fluid flowing through the conduit 408 and a fluid flowing through the casing 402. Such a heat exchanger is useful, of course, to effect heat exchange between any two fluids, one of which enters the exchanger through the inlet 404 and exhausts from the exchanger through the outlet 406, and the other of which fluids enters the heat exchanger through one end of the central fluid conduit 408 and exhausts from the heat exchanger through the other end of the conduit. The hotter of the two fluids may, obviously, be directed either through the casing 402 or through the conduit 404. The use of two baffle structures in the heat exchanger, one within and the other about the central conduit 408, is optional since good heat exchange between the fluids flowing through the exchanger can be attained by the use of either baffle structure alone.

The heat exchange apparatus of FIG. 10 is generally illustrative of the use of my spiral-flow-inducing baffles in heat exchange apparatus. The specific apparatus of FIG. 10, however, is not to be taken as limitative in any sense on the broad invention. Various combinations of fluids may be used in the apparatus. Thus, hot air may be used within the fluid conduit, to heat water in the outer conduit. As another possibility, hot air within the conduit may heat a larger volume of hot air in a large chamber outside the conduit, as in a forced air heat exchange system. Thus, for example, gas-heated air and combustion products may be conveyed through a vertical conduit equipped with my baffle structure. Outside this conduit, air to be heated may be circulated, either longitudinally of the conduit, or laterally thereof, and this latter air may be forced to flow past the outside of the conduit by a suitable blower, and may be conveyed away to a place of utilization.

It will be seen that the baffle structures of the invention are especially advantageous in heat exchanger apparatus. They provide, first, long flow paths along the tube walls. These flow paths may be made quite long by arranging the baffle plates at large angles to the tube axis. Second, they assure exceptionally good mixing of the fluid, and thus good temperature distribution, whereby the fluid flowing adjacent the walls is at optimum temperature. Third, they assure vigorous scrubbing of the spiral flow fluid against the surfaces of the conduit, as well as, in fact, against the baffles themselves, thereby removing the heat insulating boundary layers, which has the effect of improving heat transfer performance, as well as reducing boundary layer drag on the fluids flowing along the conduit walls and along the baffles.

It is evident from the preceding description that one highly unique and desirable feature of the present spiral-flow-inducing baffle structures resides in their essentially wide open, multi-spiral configuration which presents maximum, effective flow path area and thereby minimum resistance to fluid flowing through the baffle structures. As a consequence, the baffle structures create minimal back pressure in the fluid. As noted earlier, the back pressure created by the present baffle structures can be further reduced by increasing the angle of the baffle plates.

Another important feature of the invention resides in the fact that the effective length of the spiral fluid flow paths through the present baffle structures is substantially increased with respect to the axial length of the structures without creating any substantial back pressure in the fluid stream in which the baffle structures are located. Depending upon the diameter and angle of the baffle plates, for example, the effective length of the spiral flow paths through a present baffle structure may be double or triple the axial length of the baffle structure. Such increased flow path length is advantageous for the reasons discussed earlier.

Clearly, therefore, the invention herein described and illustrated is fully capable of attaining the several objects and advantages preliminarily set forth.

While certain presently preferred embodiments of the invention have been disclosed, these embodiments are intended to be illustrative rather than limitative of the invention and are presented merely to facilitate a complete understanding of the invention. It is to be distinctly understood that many additional uses of the baffle structures of the invention are envisioned and may be found, including uses such as for guiding ionized gases, electron streams, or for any other purpose wherein they may fulfill a useful function.

Accordingly, it is to be understood that various modifications in the design, arrangement of parts, instrumentalities and applications of the invention are possible within the spirit and scope of the following claims.

I claim:
1. An exhaust muffler, comprising:
   a muffler housing;
   a perforate exhaust pipe extending through said housing, there being an exhaust passage in said pipe;
   a series of baffle plate pairs mounted in said pipe in spaced relationship along the longitudinal axis of said pipe;
   the two baffle plates of all of said pairs being located predominantly on opposite sides of a common longitudinal plane through said axis, and being arranged to cross one another substantially at said axis and at opposite acute angles to said plane, said crossing plates having inner edges in proximity to said plane and outer edges substantially adjacent to the inner surface of said pipe, each baffle plate of a given pair terminating longitudinally of the pipe in an extremity which lies adjacent to the extremity of that baffle plate of the next succeeding pair which is on the opposite side of said longitudinal plane,
   said crossing baffle plates affording two unobstructed spiral gas passages turning about one another, and affording also a succession of acoustic reflecting surfaces diagonally across the cross-sectional areas of said pipe which are on opposite sides of said longitudinal plane, whereby acoustic waves traversing said pipe encounter said reflecting surfaces and are thereby directed outwardly toward the perforate wall of said pipe.
2. The subject matter of claim 1, wherein said baffle plates contain multiple perforations.
3. The subject matter of claim 1, wherein at least some of said baffle plates are curved in the region of their extremities.
4. The subject matter of claim 1, wherein the baffle plates of different baffle plate pairs are disposed at different angles to the longitudinal axis of the pipe.
5. In an acoustic wave absorber, the combination of a conduit bounded by acoustically absorbent means;
   a series of baffle plate pairs mounted in said conduit in spaced relationship along the longitudinal axis of said conduit;
   the two baffle plates of all of said pairs being located predominantly on opposite sides of a common longitudinal plane through said axis, and being arranged to cross one another substantially at said axis and at opposite acuate angles to said plane, said crossing plates having inner edges in proximity to said plane and outer edges substantially adjacent to the inner surface of said conduit, each baffle plate of a given pair terminating longitudinally of the conduit in an extremity which lies adjacent to the extremity of that baffle plate of the next succeeding pair which is on the opposite side of said longitudinal plane,
   said crossing baffle plates affording two unobstructed spiral gas passages turning about one another, and affording also a succession of acoustic reflecting surfaces diagonally across the cross-sectional areas of said conduit which are on opposite sides of said longitudinal plane, whereby acoustic waves traversing said conduit encounter said reflecting surfaces and are thereby directed outwardly toward the boundary of said conduit.

References Cited by the Examiner
UNITED STATES PATENTS

| | | | |
|---|---|---|---|
| 1,833,871 | 11/1931 | Ewing et al. | 165—160 X |
| 2,016,341 | 10/1935 | Nelson | 138—38 X |
| 2,067,133 | 1/1937 | Wales | 138—38 |

(Other references on following page)

UNITED STATES PATENTS

| | | | |
|---|---|---|---|
| 2,268,386 | 12/1941 | Fisher | 165—159 X |
| 2,384,714 | 9/1945 | Villiger | 165—161 |
| 2,613,758 | 10/1952 | Cullum | 181—50 |
| 2,693,942 | 11/1954 | Guala | 165—161 |
| 2,808,896 | 10/1957 | Wilman | 181—50 |
| 2,895,508 | 7/1959 | Drake | 138—38 |
| 2,993,682 | 7/1961 | Huet | 165—141 X |
| 3,077,716 | 2/1963 | Wilson | 55—510 X |

ROBERT A. O'LEARY, *Primary Examiner.*

CHARLES SUKALO, *Examiner.*